United States Patent Office 2,816,824
Patented Dec. 17, 1957

2,816,824
CERIUM OXIDE POLISHING COMPOSITION

Harold Wilansky, Corning, N. Y., assignor to Corning Glass Works, Corning, N. Y., a corporation of New York No Drawing. Application December 28, 1953,
Serial No. 400,815

4 Claims. (Cl. 51—308)

This invention relates to a polishing composition comprising an aqueous suspension of cerium oxide and is particularly directed to minimizing the tendency of cerium oxide to settle out of such a suspension and form a cake.

Cerium oxide is widely used in the polishing of glassware and the like and is conventionally employed for such purpose in the form of an aqueous suspension. Such a suspension is customarily intermittently applied to a rotating or revolving felt-covered polishing tool either by hand as with a suitable brush or mechanically as by means of an atomizer utilizing compressed air. In the former case the suspension is subjected to agitation during each application; in the latter case, unless mechanical agitation is provided, the cerium oxide tends to settle out of the suspension. On account of its relatively high density, the cerium oxide on settling forms a cake which is difficult to redisperse particularly if it is allowed to stand. Since it is much easier to prepare a fresh cerium oxide suspension, it has been the general experience that the caked composition is discarded with the result that a substantially economic loss is incurred due to the relatively high cost of cerium oxide.

The use of various dispersing or deflocculating agents such as the water-soluble alkali-metal silicates has been proposed to overcome these difficulties. None of such agents, however, adequately prevents settling of the cerium oxide and has little or no effect on its caking tendency.

I have now discovered that the settling and caking of an aqueous suspension of cerium oxide can be satisfactorily minimized by incorporating into the suspension a gelatinous, substantially water-insolube silicate. The resulting composition comprises an aqueous suspension containing up to about 6% of solids consisting essentially of cerium oxide and a gelatinous, substantially water-insoluble silicate in a minor amount up to about 25% of said solids on the dry basis, the silicate not exceeding about 0.5% of the entire composition.

While the gelatinous silicate can, if desired, be precipitated separately and added to the cerium oxide suspension, it is desirably formed in situ by mixing in the suspension a soluble alkali-metal silicate and a soluble salt of a metal, advantageously a metal of the second periodic group, which will react with the alkali-metal silicate to form a gelatinous, substantially water-insoluble silicate. Various soluble salts of such metals may be utilized such as, for example, the chlorides, the sulfates, and the acetates. Hydrated magnesium sulfate or Epsom salt is particularly suitable because it is adequately water-soluble, readily available, and non-toxic.

The incorporation of the gelatinous water-insoluble silicate in the suspension, so far as can be determined, results in an intimate mixture thereof with the cerium oxide whereby the size of each individual particle of the cerium oxide is increased by the silicate associated therewith and its density is correspondingly decreased. In any event, the settling tendency of the cerium oxide particles when combined with the gelatinous silicate is greatly diminished; and, when such a suspension is allowed to stand until it settles, the resulting precipitate does not form a cake and a slight agitation readily disperses it.

In preparing the present composition it is advantageous to utilize previously prepared aqueous solutions of the metal salt and the alkali-metal silicate and mix them together with the cerium oxide in water. By way of example, the following composition has been found particularly suitable:

| | | |
|---|---|---|
| Water | cc | 3800 |
| Epsom salt | g | 18 |
| $CeO_2$ | g | 113 |
| Sodium silicate solution, sp. gr. 1.073 (8.9% $Na_2O$, 28.7% $SiO_2$) | cc | 25 |

Any other soluble sodium silicate or soluble alkali-metal silicate may be used to provide an equivalent amount of $SiO_2$. The materials are preferably mixed in the order given above. Calculated on the dry basis, the above composition contains about 3% total solids about 1% of which is $MgSiO_3$.

The amount of Epsom salt in the foregoing example is slightly in excess of the stoichiometric amount required. While such excess is not essential, it appears to have a beneficial effect in combining and flocculating the cerium oxide with the gelatinous precipitated silicate, thereby resulting in larger individual particles having lower density and a less tendency to form a cake on settling.

A very small amount of the gelatinous water-insoluble silicate has a marked beneficial effect in retarding settling of the cerium oxide and diminishing its tendency to form a cake, but an amount in excess of about 25% of the total solids on the dry basis makes the suspension difficult to atomize and tends to glaze the surface of the felt polishing tool. Likewise, the amount of total solids in the suspension, of which cerium oxide comprises the major proportion, should not exceed about 6% due to the objectionable increase in the viscosity of the suspension that is thereby encountered.

The viscosity of the suspension will vary with the relative amounts of cerium oxide and the water-insoluble silicate but tends to become objectionably high if both are at or near the maximum. No difficulty is encountered, however, if the amount of the silicate does not exceed about 0.5% of the entire composition.

I claim:

1. A method of minimizing the settling and caking tendencies of a polishing composition comprising an aqueous suspension of cerium oxide, which includes forming in an aqueous suspension of cerium oxide a freshly precipitated, gelatinous, substantially water-insoluble metal silicate amounting to about 1 to 25% of the total solids on the dry basis, the total solids being about 3 to 6% of the entire composition, the silicate being about 0.3 to 0.5% of the entire composition.

2. A polishing composition comprising an aqueous suspension containing about 3 to 6% of solids consisting essentially of cerium oxide and a freshly precipitated, gelatinous, substantially water-insoluble metal silicate amounting to about 1 to 25% of said solids on the dry basis, the silicate being about 0.3 to 0.5% of the entire composition.

3. The method of claim 1, in which the water-insoluble silicate is magnesium silicate.

4. The polishing composition of claim 2 in which the water-insoluble silicate is magnesium silicate.

References Cited in the file of this patent

UNITED STATES PATENTS

| | | |
|---|---|---|
| 1,951,555 | Masin | Mar. 20, 1934 |
| 2,006,162 | Fuchs | June 25, 1935 |
| 2,275,261 | Kerstan | Mar. 3, 1942 |
| 2,299,764 | Paquet | Oct. 27, 1942 |
| 2,554,070 | Stead | May 22, 1951 |